United States Patent
Tabata et al.

(10) Patent No.: US 6,886,335 B2
(45) Date of Patent: May 3, 2005

(54) DEVICE FOR PREVENTING THE TURBO-CHARGER FROM OVER-RUNNING

(75) Inventors: Tetsuo Tabata, Kanagawa (JP); Naohito Metoki, Kanagawa (JP); Takayuki Tazawa, Kanagawa (JP); Kenji Hagio, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 96 days.

(21) Appl. No.: 10/714,890

(22) Filed: Nov. 18, 2003

(65) Prior Publication Data

US 2004/0098985 A1 May 27, 2004

(30) Foreign Application Priority Data

Nov. 21, 2002 (JP) .................................. 2002-338183

(51) Int. Cl.⁷ .............................................. F02D 23/00
(52) U.S. Cl. ....................................................... 60/602
(58) Field of Search ................................... 60/600–603

(56) References Cited

U.S. PATENT DOCUMENTS

| | | | | | |
|---|---|---|---|---|---|
| 3,931,712 | A | * | 1/1976 | Keller .......................... | 60/602 |
| 4,292,807 | A | * | 10/1981 | Rannenberg ................. | 60/601 |
| 4,466,248 | A | * | 8/1984 | Nartowski .................... | 60/602 |
| 4,468,928 | A | * | 9/1984 | Suzuki ......................... | 60/602 |
| 4,548,038 | A | * | 10/1985 | Matsuki ....................... | 60/602 |
| 4,603,552 | A | * | 8/1986 | Kido ........................... | 60/605.1 |
| 4,612,770 | A | * | 9/1986 | Tadokoro et al. ............. | 60/602 |
| 4,642,991 | A | * | 2/1987 | Kawabata ..................... | 60/602 |
| 4,697,421 | A | * | 10/1987 | Otobe et al. .................. | 60/602 |
| 4,703,625 | A |   | 11/1987 | Caldwell ....................... | 60/602 |
| 5,083,434 | A | * | 1/1992 | Dahlgren et al. ............. | 60/602 |
| 5,289,683 | A | * | 3/1994 | Kurihara ...................... | 60/602 |
| 6,178,748 | B1 | * | 1/2001 | Oleksiewicz ................. | 60/602 |
| 6,467,269 | B1 | * | 10/2002 | Dutart ......................... | 60/602 |
| 2002/0088225 | A1 |   | 7/2002 | Koch et al. .................... | 60/602 |

FOREIGN PATENT DOCUMENTS

| | | | | |
|---|---|---|---|---|
| GB | 1 532 516 | | 11/1978 | .................. 60/602 |
| JP | 57052635 A | * | 3/1982 | .......... F02B/37/12 |

OTHER PUBLICATIONS

European Search Report dated Mar. 8, 2004.

* cited by examiner

*Primary Examiner*—Thai-Ba Trieu
(74) *Attorney, Agent, or Firm*—James N. Dresser, Esq.

(57) ABSTRACT

A device for preventing the turbo-charger from over-running, wherein an actuator is arranged in a by-pass bypassing a turbine of the turbo-charger and operates a waste gate valve. The actuator has a positive pressure chamber communicated, via a boost pipe, with an intake air passage downstream of a compressor and a negative pressure chamber communicated with a source of negative pressure via a negative pressure pipe. The negative pressure chamber is so constituted as to be supplied with a negative pressure to have a target pressure that is set relative to the atmospheric pressure.

1 Claim, 2 Drawing Sheets

DEVICE FOR PREVENTING THE TURBO-CHARGER FROM OVER-RUNNING

FIELD OF THE INVENTION

The present invention relates to a device for preventing a turbo-charger provided for an internal combustion engine from over-running.

DESCRIPTION OF THE RELATED ART

An internal combustion engine furnished with a turbo-charger is provided with a waste gate mechanism for preventing the turbo-charger from over-running. The waste gate mechanism comprises a by-pass that bypasses the turbine, a waste gate valve arranged in the by-pass, and an actuator that operates the waste gate valve by utilizing a boost pressure. In the thus constituted waste gate mechanism, the waste gate valve is opened and closed according to a balance between the boost pressure which is a source of driving the actuator and the exhaust gas pressure acting on a return spring disposed in the actuator and on the waste gate vale. In other words, the boost pressure is determined, i.e., the pressure at the outlet of the compressor of the turbo-charger is determined by the preset load of the return spring and the exhaust gas pressure acting on the waste gate valve.

By the way, in the case where the atmospheric pressure becomes low in a district of high altitudes, the pressure ratio between the inlet pressure and the outlet pressure of the compressor increases in the turbo-charger that operates in a state of a low atmospheric pressure. As a result, the rotational speed of the turbine increases and, in the worst case, the turbo-charger rotates at a speed in excess of a maximum permissible rotational speed and may be broken. When a vehicle mounting the internal combustion engine with turbo-charger is used in a region where there is a great difference in the altitude, the boost pressure must be set to be not so high to prevent the over-running in a high land where the atmospheric pressure is low, with sacrificing the performance in the low lands, or it is necessary to employ a turbo-charger of a large capacity having a sufficient margin in the pressure ratio.

In order to solve the above-mentioned problem, JP-A 8-200082 proposes a device for preventing the turbo-charger from over-running by forming a second by-pass in the exhaust passage upstream of the by-pass in which a waste gate valve is disposed, arranging a relief valve with a sonic nozzle in the second by-pass, and opening the relief valve when the rotational speed of the turbo charger reaches an over-running zone.

In the device disclosed in the above publication, however, the second by-pass is arranged on the outside of the waste gate valve, and it is needed to arrange the relief valve with the sonic nozzle in the second by-pass, causing the structure to become complex and raising the cost of production.

SUMMARY OF THE INVENTION

It is an object of the present invention to provide an inexpensive device for preventing the turbo-charger from over-running, which is capable of preventing the over-running in a high land where the atmospheric pressure is low, without sacrificing the performance in a low land, by controlling the actuator that operates the waste gate valve based on the boost pressure and the atmospheric pressure.

In order to achieve the above object according to the present invention, there is provided a device for preventing the turbo-charger from over-running, comprising a turbo-charger having a turbine arranged in an exhaust gas passage of an internal combustion engine and a compressor that is arranged in an intake air passage of the internal combustion engine and is driven by the turbine, a waste gate valve arranged in a by-pass bypassing the turbine, and an actuator that has a positive pressure chamber communicated, via a boost pipe, with the intake air passage downstream of the compressor and a negative pressure chamber communicated with a source of negative pressure via a negative pressure pipe and operates the waste gate valve; characterized in that:

the device comprises a pressure adjusting valve arranged in the negative pressure pipe and for adjusting the pressure in the negative pressure chamber;

a pressure sensor for detecting the pressure in the negative pressure chamber;

an atmospheric pressure sensor for detecting the atmospheric pressure; and a control means for controlling said pressure adjusting valve based on the detection signals from the atmospheric pressure sensor and the pressure sensor; and that:

the control means has a storage means for storing a target pressure in the negative pressure chamber, which corresponds to the atmospheric pressure, and controls the pressure adjusting valve so as to make the pressure in the negative pressure chamber become equal to said target pressure, based on the atmospheric pressure detected by the atmospheric pressure sensor and on the pressure in the negative pressure chamber detected by the pressure sensor.

DETAILED DESCRIPTION OF THE PREFERRED EMBODIMENT

A preferred embodiment of a device for preventing a turbo-charger from over-running constituted according to the present invention will be described in more detail with reference to the accompanying drawings.

Figure 1:
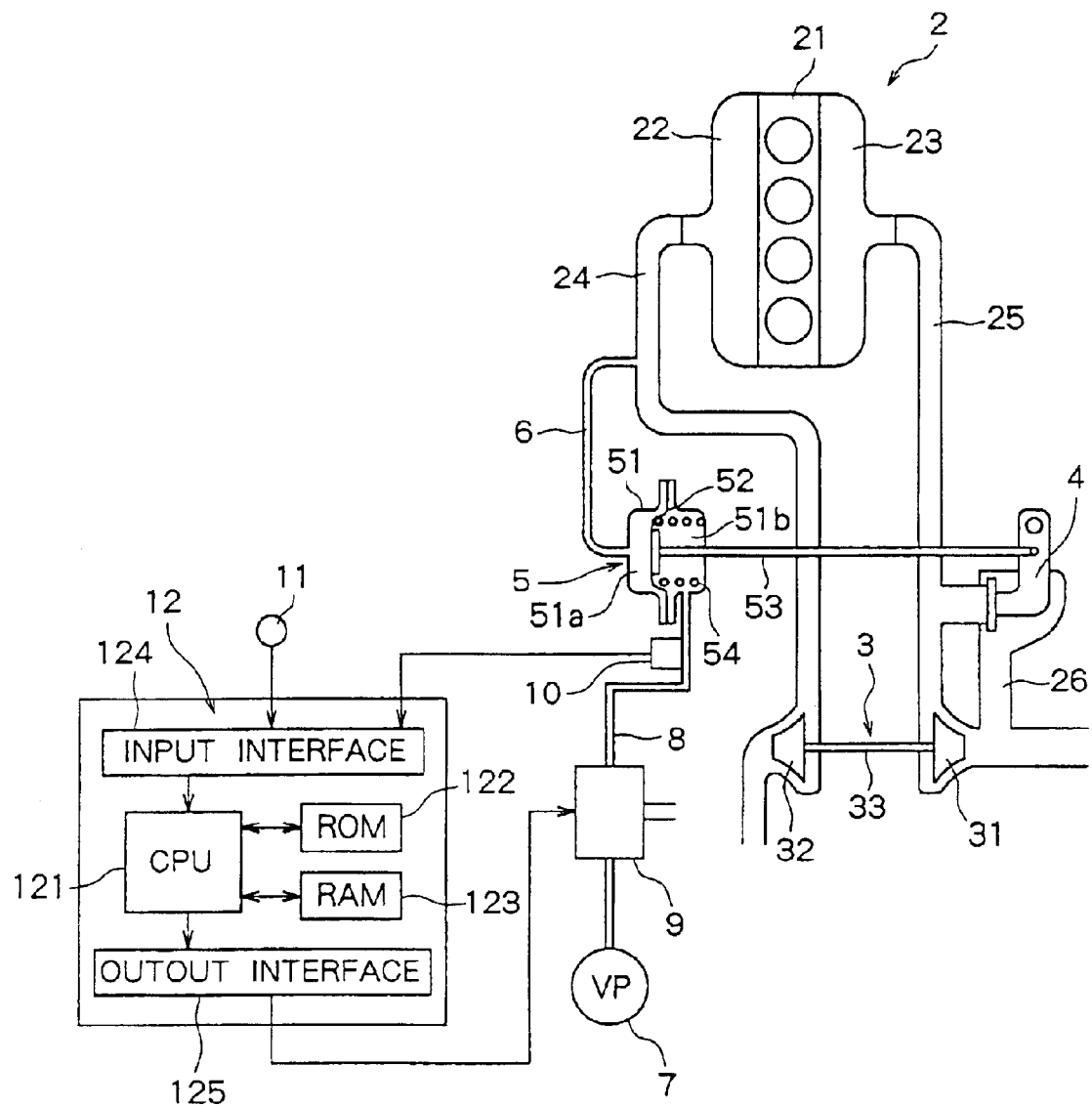
FIG. 1 is a block diagram illustrating the constitution of a device for preventing the turbo-charger from over-running, constituted according to the present invention.

FIG. 1 is a block diagram illustrating the constitution of a device for preventing the turbo-charger from over-running, constituted according to the present invention.

In the illustrated embodiment, the internal combustion engine 2 is a diesel engine which includes an internal combustion engine body 21, an intake manifold 22 and an exhaust manifold 23. An intake air passage 24 is connected to the intake manifold 22, and an exhaust gas passage 25 is connected to the exhaust gas manifold 23. A turbo charger 3 is arranged in the intake air passage 24 and in the exhaust gas passage 25. The turbo-charger 3 includes a turbine 31 arranged in the exhaust gas passage 25, a compressor 32 arranged in the intake air passage 24, and a rotary shaft 33 for coupling the turbine 31 to the compressor 32.

The exhaust gas passage 25 is provided with a by-pass 26, which communicates the upstream side of the turbine 31 with the downstream side thereof, i.e., bypasses the turbine 31. A waste gate valve 4 is arranged in the by-pass 26. The waste gate valve 4 is operated by an actuator 5. In the illustrated embodiment, the actuator 5 is constituted by a casing 51, a diaphragm 52 arranged in the casing 51 to section the interior of the casing 51 into a positive pressure chamber 51a and a negative pressure chamber 51b, an operation rod 53 that is coupled at its one end to the diaphragm 52 and is coupled at the other end to the waste gate valve 4, and a return spring 54 arranged in the negative pressure chamber 51b to urge the diaphragm 52 toward the left in the drawing, i.e., to urge the waste gate valve 4 in a direction to close the valve at all times. In the thus constituted actuator 5, the positive pressure chamber 51a is communicated with the intake air passage 24 downstream of the compressor 32 in the intake air passage 24 by a boost pipe 6, and the negative pressure chamber 51b is communicated with a vacuum pump 7 which is a source of negative pressure by a negative pressure pipe 8. A pressure adjusting valve 9 for adjusting the pressure in the negative pressure chamber 51b is arranged in the negative pressure pipe 8 communicating the negative pressure chamber 51b with the vacuum pump 7. The pressure adjusting valve 9 is a three-way valve and is operated by a pulse width modulation (PWM) signal from a control means that will be described later. When the pulse width modulation (PWM) signal has a minimum pulse width, the pressure adjusting valve 9 works to open the negative pressure pipe 8 to the atmosphere while shutting it off on the side of the vacuum pump 7. In a state where the pressure adjusting valve 9 is thus worked to open the negative pressure pipe 8 to the atmosphere while shutting it off on the side of the vacuum pump 7, the actuator 5 is operated by the boost pressure only.

The device for preventing the turbo-charger from over-running of the illustrated embodiment has a pressure sensor 10 that is arranged in the negative pressure pipe 8 and detects the pressure in the negative pressure chamber 51b, and an atmospheric pressure sensor 11 for detecting the atmospheric pressure. These sensors send their detection signals to a control means 12. The control means 12 is constituted by a microcomputer and has a central processing unit (CPU) 121 that executes an arithmetic processing according to a control program, a read-only memory (ROM) 122 that is a storage means for storing a control program and a control map setting a target pressure in the negative pressure chamber 51b, relative to the atmospheric pressure as will be described later, a random access memory (RAM) 123 for storing the results of operation, an input interface 124 and an output interface 125. The thus constituted control means 12 receives, through the input interface 124 thereof, detection signals from the pressure sensor 10 and the atmospheric pressure sensor 11, and produces a pulse width modulation (PWM) signal to transmit it to the pressure adjusting valve 9 through the output interface 125 thereof.

The device for preventing the turbo-charger from over-running according to the illustrated embodiment is constituted as described above. Described below is the operation thereof.

The exhaust gas emitted from the exhaust port of the internal combustion engine body 21 into the exhaust gas passage 25 through the exhaust manifold 23 works to operate the turbine 31 in the turbo-charger 3 before it is emitted. On the other hand, the intake air taken in from the atmosphere has a pressure raised by the compressor 32 that is driven by the rotation of the turbine 31 and is supplied to the engine body 21, through the intake air passage 24. When the rotational speed of the turbo-charger 3 is lower than a predetermined value, the boost pressure in the intake air passage 24 is maintained to be not larger than a predetermined value. Therefore, even when the boost pressure acts on the positive pressure chamber 51a in the actuator 5 through the boost pipe 6, the waste gate valve 4 is maintained in the closed state due to the urging force in the direction of closing the valve, produced by the return spring 54 and the exhaust gas pressure acting on the waste gate valve 4. Then, as the boost pressure in the intake air passage 24 increases to exceed the predetermined value due to an increase in the rotational speed of the turbo-charger 3 which is caused by an increase in the energy of the exhaust gas, the diaphragm 52 of the actuator 5 moves toward the right in FIG. 1 due to the boost pressure acting on the positive pressure chamber 51a in the actuator 5 against the return sprig 54 and the exhaust gas pressure acting on the waste gate valve 4, and the waste gate valve 4 is opened by the operation rod 53. As a result, since part of the exhaust gas is emitted through the by-pass 26 bypassing the turbine 31, the exhaust gas energy acting on the turbine 31 decreases, the rotational speed of the turbine 31 decreases and consequently, the turbo-charger 3 is prevented from over-running.

As the altitude becomes high and the atmospheric pressure becomes low, the pressure ratio between the inlet pressure and the outlet pressure of the compressor 32 of the turbo-charger 3 increases as described above. Accordingly, the rotational speed of the turbine 31 increases and, in the worst case, exceeds a maximum permissible rotational speed, resulting in a breakage of the turbo-charger 3. In order to solve this problem, in the illustrated embodiment, a negative pressure set relative to the atmospheric pressure is caused to act on the negative pressure chamber 51b in the actuator 5 to open the waste gate valve 4 even when the boost pressure is lower than the predetermined value, in case the atmospheric pressure is low, Thereby, the rotational speed of the turbine 31 is lowered to prevent the turbo-charger from over-running.

Next, the negative pressure acting on the negative pressure chamber 51b of the actuator 5 will be described in detail.

Figure 2:
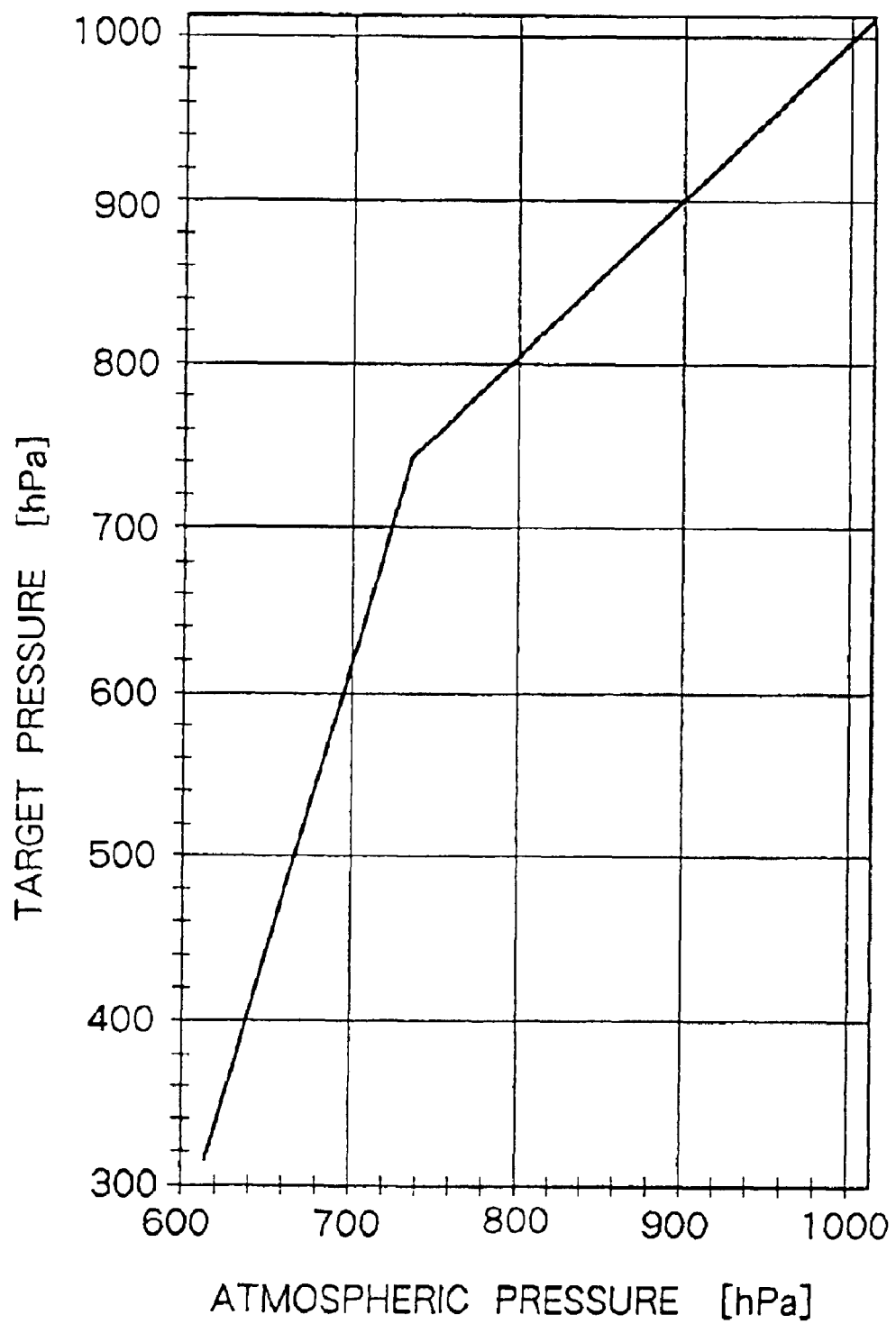
FIG. 2 is a control map setting target pressures in a negative pressure chamber, relative to the atmospheric pressures.

The read-only memory (ROM) 122 in the control means 12 stores a control map in which the target pressure in the negative pressure chamber 51b is set based on the atmospheric pressures as shown in FIG. 2. In a state where the atmospheric pressure is higher than about 740 hectopascals (hPa) as will be learned from this control map, the target pressure in the negative pressure chamber 51b is set to be the same value as the atmospheric pressure. And, as the atmospheric pressure becomes lower than about 740 hectopascals (hPa), the target pressure in the negative pressure chamber 51b is set to become gradually lower than the atmospheric pressure. The target pressure based on the atmospheric pressure varies depending upon the characteristics of the internal combustion engine and of the turbo-charger, and is suitably set depending upon a combination of the internal combustion engine and the turbo-charger.

On the other hand, the control means 12 receives detection signals from the pressure sensor 10 and the atmospheric pressure sensor 11. Based upon the atmospheric pressure detected by the atmospheric pressure sensor 11, the control means 12 determines a target pressure in the negative pressure chamber 51b with reference to the control map shown in FIG. 2. After the target pressure in the negative pressure chamber 51b in the actuator 5 is determined as described above, the control means 12 sets a pulse width based on a difference between the target pressure and the pressure in the negative pressure chamber 51b detected by the pressure sensor 10, and sends a pulse width modulation (PWM) signal having the thus set pulse width, to the pressure adjusting valve 9. This control operation is fed back until the pressure in the negative pressure chamber 51b comes into agreement with the target pressure. For example, in a state where the atmospheric pressure is higher than about 740 hectopascals (hPa), the target pressure in the negative pressure chamber 51b has been set to be nearly equal to the atmospheric pressure. Therefore, the pulse width of the pulse width modulation (PWM) signal output to the pressure adjusting valve 9 is set to be a minimum and consequently, the pressure adjusting valve 9 opens the negative pressure pipe 8 to the atmosphere and shuts it off on the side of the vacuum pump 7. As a result, the interior of the negative pressure chamber 51b has the atmospheric pressure, and the actuator 5 is operated by the boost pressure only. When the atmospheric pressure becomes lower than about 740 hectopascals (hPa), on the other hand, since the target pressure in the negative pressure chamber 51b is set to be lower than the atmospheric pressure, a pulse width modulation (PWM) signal having a pulse width set based on a difference between the target pressure and the pressure in the negative pressure chamber 51b detected by the pressure sensor 11 is sent to the pressure adjusting valve 9, as described above. As a result, the pressure adjusting valve 9 permits the negative pressure pipe 8 to be communicated with the vacuum pump 7, whereby a negative pressure is supplied into the negative pressure chamber 51b and the pressure drops therein. This brings about the same effect as the case where the set pressure of the waste gate valve 4 is decreased. When the atmospheric pressure is low, therefore, the waste gate valve 4 is opened even when the boost pressure is lower than the predetermined value. Accordingly, since part of the exhaust gas is emitted through the by-pass 26 bypassing the turbine 31, the exhaust gas energy acting on the turbine 31 decreases, the rotational speed of the turbine 31 decreases and consequently, the turbo-charger 3 is prevented from over-running in a state where the atmospheric pressure is low.

As described above, the device for preventing the turbo-charger from over-running of the illustrated embodiment drives the actuator 5 that operates the waste gate valve 4 by a boost pressure that basically acts in the positive pressure chamber 51a, and, when the atmospheric pressure becomes low, effects the correction by using a negative pressure that acts on the negative pressure chamber 51b. Therefore, the control operation can be executed without time lag for a change in the rotational speed of the internal combustion engine or for a change in the rotational speed of the turbo-charger 3 caused by variation in the load. While the internal combustion engine is in operation, the pressure in the positive pressure chamber 51a of the actuator 5 fluctuates due to changes in the inlet pressure of the turbine 31 and in the outlet pressure of the compressor 32 stemming from a change in the rotational speed or the load. Therefore, the pressure in the negative pressure chamber 51b, too, fluctuates with the fluctuation of pressure in the positive pressure chamber 51a. This fluctuation, however, can be adjusted by the feedback control operation described above.

The device for preventing the turbo-charger of the engine from over-running of the invention is constituted as described above. Described below is the operation effect thereof.

Namely, the actuator for operating the waste gate valve has a positive pressure chamber communicated, through a boost pipe, with the intake air passage downstream of the compressor and a negative pressure chamber communicated with a source of negative pressure through a negative pressure pipe, the negative pressure chamber being supplied with a negative pressure so as to have a target pressure that has been set relative to the atmospheric pressure. When the atmospheric pressure is low, therefore, the waste gate valve is opened even when the boost pressure is lower than the predetermined value. According to the present invention, therefore, there is provided an inexpensive device for preventing the turbo-charger from over-running, which is capable of preventing the over-running in high lands where the atmospheric pressure is low, without sacrificing performance in low lands.

We claim:

1. A device for preventing the turbo-charger from over-running, comprising a turbo-charger having a turbine arranged in an exhaust gas passage of an internal combustion engine and a compressor arranged in an intake air passage of the internal combustion engine and is driven by said turbine, a waste gate valve arranged in a by-pass bypassing said turbine, and an actuator that has a positive pressure chamber communicated, via a boost pipe, with said intake air passage downstream of said compressor and a negative pressure chamber communicated with a source of negative pressure via a negative pressure pipe and operates said waste gate valve; characterized in that: said device comprises a pressure adjusting valve arranged in said negative pressure pipe and for adjusting the pressure in said negative pressure chamber, a pressure sensor for detecting the pressure in said negative pressure chamber, an atmospheric pressure sensor for detecting the atmospheric pressure, and a control means for controlling said pressure adjusting valve based on the detection signals from said atmospheric pressure sensor and said pressure sensor; and that:

said control means has a storage means for storing a target pressure in said negative pressure chamber, which corresponds to the atmospheric pressure, and controls said pressure adjusting valve so that the pressure in the negative pressure chamber becomes equal to said target pressure, based on the atmospheric pressure detected by said atmospheric pressure sensor and on the pressure in said negative pressure chamber detected by said pressure sensor.

* * * * *